June 7, 1932.  W. B. STOUT  1,862,102
AIRPLANE
Original Filed March 29, 1919  5 Sheets-Sheet 2
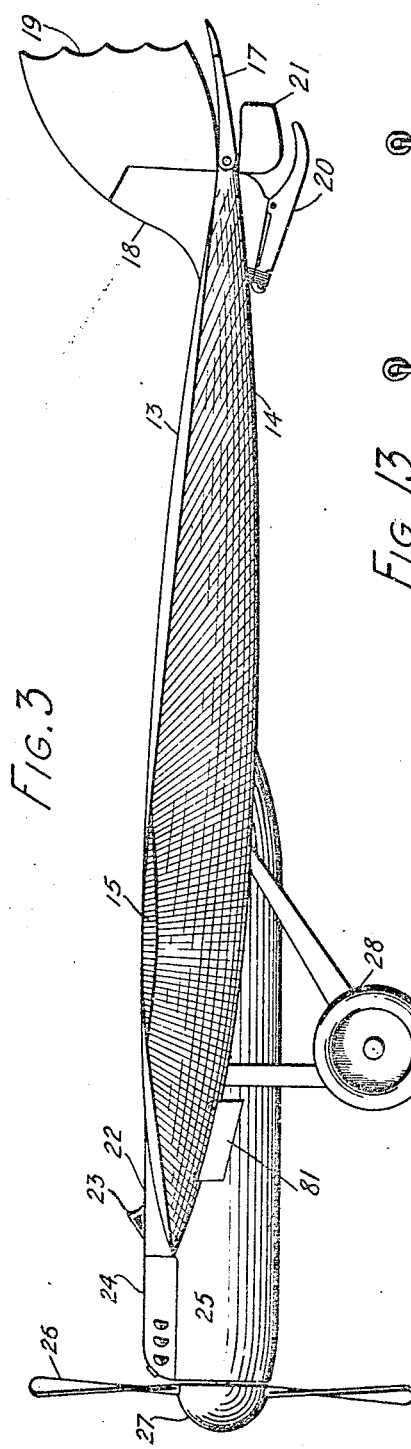
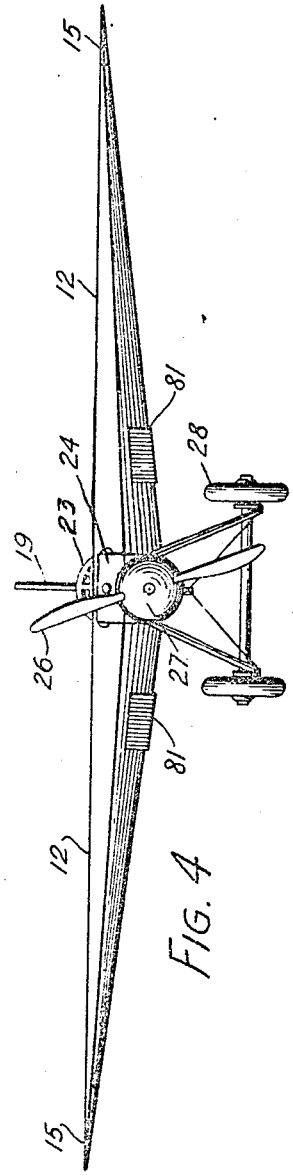
INVENTOR
William B. Stout.
BY Clifford Brown
ATTORNEY INVENTOR:
William B. Stout
BY
ATTORNEY

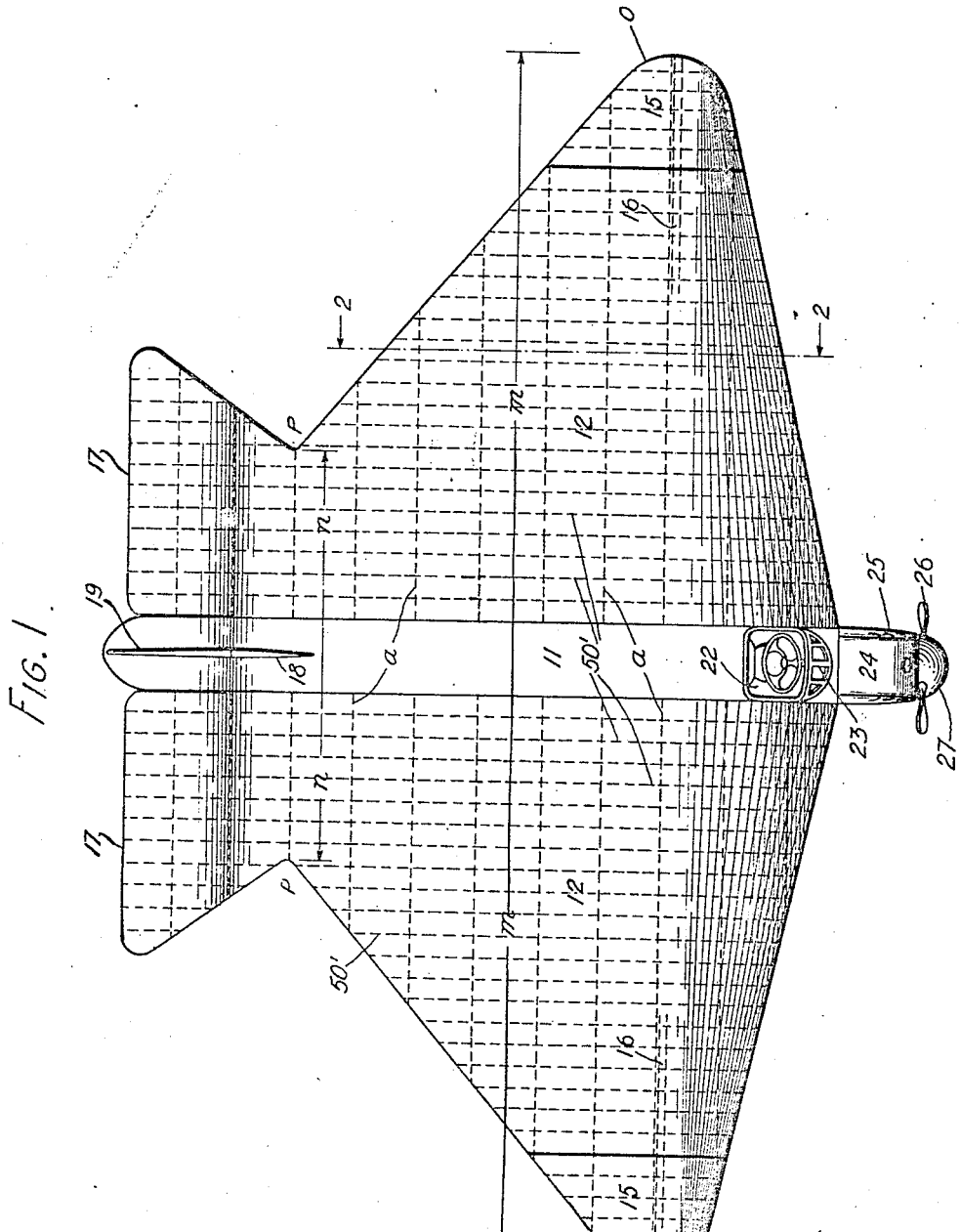

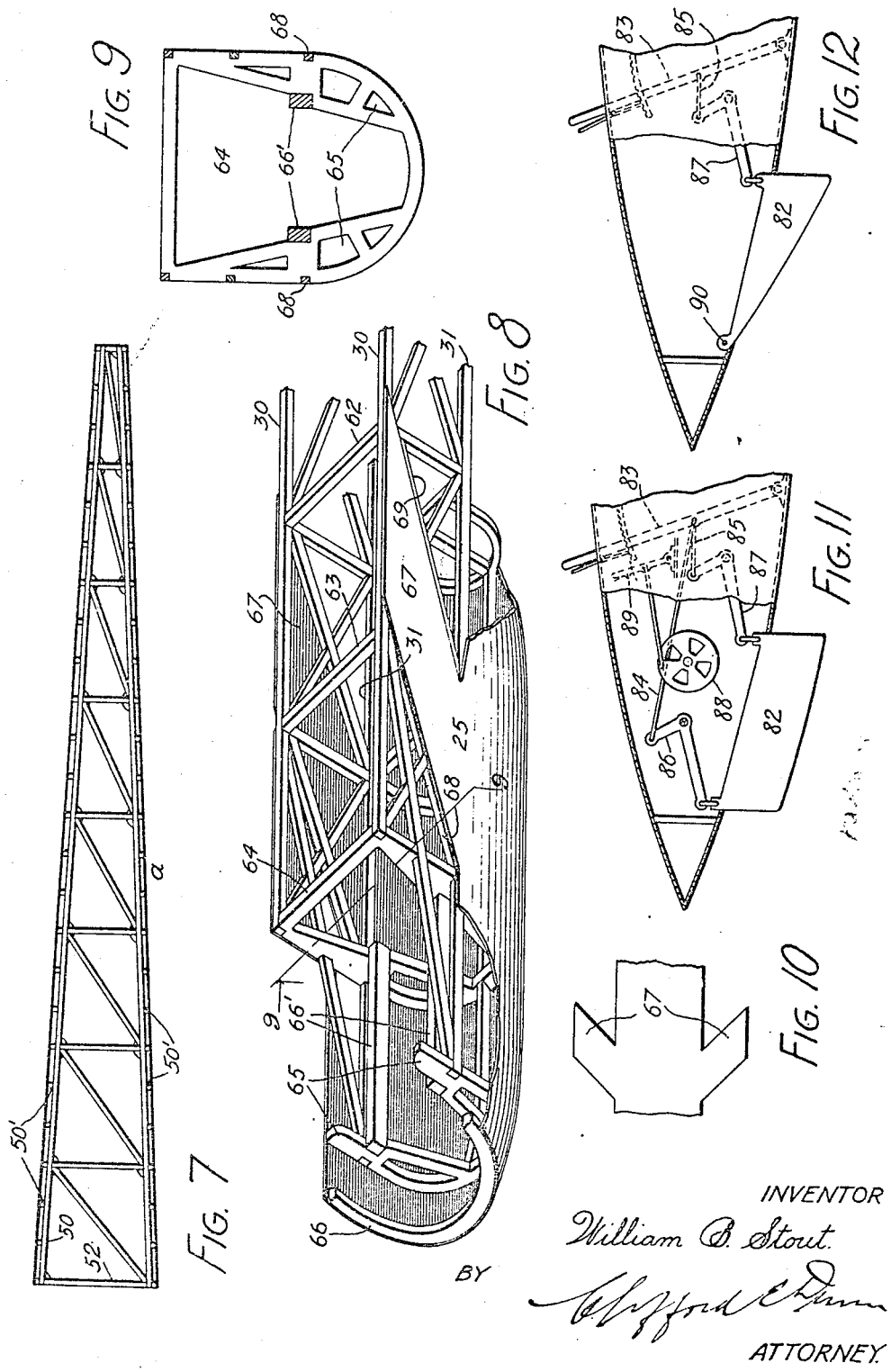

June 7, 1932.     W. B. STOUT     1,862,102
AIRPLANE
Original Filed March 29, 1919     5 Sheets-Sheet 5

INVENTOR
William B. Stout.
BY
ATTORNEY.

Patented June 7, 1932

1,862,102

UNITED STATES PATENT OFFICE

WILLIAM B. STOUT, OF DETROIT, MICHIGAN, ASSIGNOR TO FORD MOTOR CO., OF HIGHLAND PARK, MICHIGAN

AIRPLANE

Application filed March 29, 1919, Serial No. 285,951. Renewed April 6, 1932.

My invention relates to the art of aeronautics and has for an object the improvement of the structural arrangement of an airplane in such way as to increase the efficiency of the plane especially as regards low weight, speed, lifting power, stability and fuel economy. The usual heavier-than-air flying machine is made up of a multiplicity of exposed parts such as fuselage, nacelle, wings, struts, tie wires, landing gear, radiator and controls. All of these parts when exposed encounter the air when driven through it and create a resistance to horizontal movement. This resistance is known as the "drift" of the machine. This drift is of two kinds, active and parasite, depending upon the position (and form) of the surface which develops it.

The drift developed by the wings or lifting surfaces always is accompanied by a useful component called "lift" which is vertical. By this lift weight-carrying is possible. The non-lifting surfaces, as fuselage, landing-gear, struts, wires, etc., are the ones which cause the parasite resistance, or passive drift, giving back no lift for the power effort required to drive them through the air.

Parasite resistance has been very high in machine heretofore constructed, owing to the use of exposed struts, tie rods, controls, etc. Heretofore no inconsiderable part of the performance of the machine has been dependent upon careful and extensive streamlining of these exposed parts. They have, however, been a great drag upon the machine, especially at high speeds, for the passive drift or parasite resistance increases as the square of the velocity, but, unlike the active drift, has no attendant lift.

A factor in airplanes having more than one plane, known as the interference loss, also reduces the lift which would otherwise be available from the active drift. This loss, added to the other parasite resistances and the skin friction of the surfaces, consumes a large portion,—substantially three-quarters at full speed of the power supplied by the engine.

Heretofore airplanes have been constructed having a high aspect ratio of the order of 6 or 7 to 1, in order to improve the lift-drift ratio. This high ratio was necessary on account of the high passive drift which resulted from the use of exposed parts. The design of plane which I have shown to a large measure eliminates these parts, and, therefore, such a high aspect ratio is not needed.

Among the objects of my invention may be mentioned the elimination of detrimental surfaces and therefore much parasite resistance, whereby substantially all the drift or resistance will be active, forming the airplane of wing sections and a central body section so united together that all structural parts are enclosed within lifting surfaces, and the central or body section constitutes a part of the lifting surfaces. This construction provides a plane with high lift-drift and normally low aspect ratios.

Another object of my invention is to provide a landing gear which may be drawn inside when the plane is in flight.

Another object is the provision of a radiator, the exposure of which to the passing air is variable and under the control of the pilot.

Another object is to generally improve the construction of the plane from a structural point of view, as by forming the aforesaid lifting-surfaces of some comparatively-rigid material appropriately secured positively to the interior structural-members, such as plywood glued to the wing-spars, so that such surfacing not only constitutes the lifting-surfaces but also forms an integral part of the wing-structure, to which it affords compression-bracing as well as tension-bracing to maintain the lifting-surfaces rigid against distortion under conditions encountered in flying, and whereby all parts are used at their highest efficiency producing a strong, light-weight structure, which will be substantial in use.

Other objects and advantages of my invention will become evident as the description proceeds, and I would have it understood that all such objects and advantages, whether specifically pointed out or not, are within the scope of my invention, and that I reserve all rights thereto and to the structural equivalents and uses to which any of them may be put.

In the accompanying drawings I have shown a complete embodiment of my invention in one form, and have also shown modifications of certain parts. It will be appreciated, however, that these are by no means the only modifications or forms in which my invention may be embodied, and I particularly wish it to be understood that the forms shown are illustrations only, and that forms other than those shown and described may be used without departing from the spirit and scope of my invention.

In the drawings:

Fig. 1 represents a top plan view of my improved airplane showing the general arrangement of parts.

Fig. 2 is a section on plane 2—2 of Fig. 1, showing the double cambered wing curve.

Fig. 3 is a side view.

Fig. 4 is a front view of the plane shown in Figs. 1 and 2.

Fig. 7 is a diagrammatic illustration of the truss used in a typical spar.

Fig. 8 is a view showing the forward end of the body section with the housing for the engine attached thereto.

Fig. 9 is a sectional view on the plane 9 of Fig. 8.

Fig. 10 is a developed view showing a portion of the material from which the engine housing is constructed.

Fig. 11 illustrates one form of apparatus for controlling the position of the radiators.

Fig. 12 is a modified form of apparatus for controlling the radiators.

Fig. 13 is an end view of a radiator.

Figure 5:
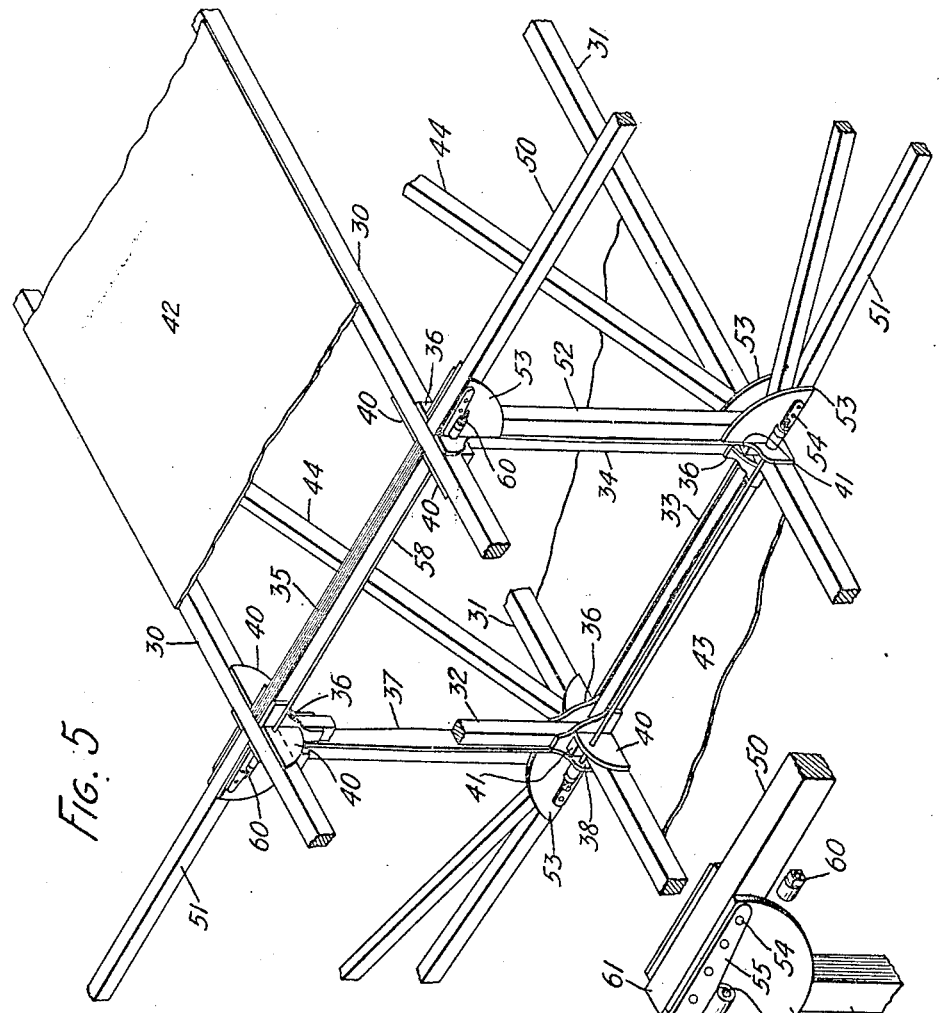
Fig. 5 is a perspective view showing the structural features of the body portion of my plane and the method of fastening the wing sections to the body portion.

In the drawings, 11 represents the body portion of my plane, and 12 the wing portions. The upper surface of the body portion, as shown in Fig. 3, is streamlined, preferably convex, as at 13, and the lower surface is also convexly stream lined as at 14. The wing portions 12 are fastened alongside the body portion 11 to provide a dihedral angle as shown in Fig. 4, and in a manner which will be pointed out in detail below and have the upper surfaces streamlined and merged with the upper surface of the body portion 11. The lower surfaces of the wings are also streamlined, preferably convex throughout, and merged with the lower surface of the body portion 11. The tail of the wing portions is preferably such as to provide a reverse curve relative to the major part of a wing portion, this reverse curve extending aft of the plane p—p, Fig. 1. Except for this reverse curve, the wing sections may be double convex as shown in outline in Fig. 2.

Each wing is provided with an aileron 15 pivoted at 16. 17—17 represent the elevators which are shaped so as to continue the reverse curve with relation to the body and wing; 18 the tail fin; 19 the main rudder, and 20 a tail skid. I have added, however, an additional rudder 21 below the elevators 17, which is pivoted on the same axis as the main rudder 19. I find that this rudder improves the control of the machine as it acts against the relatively moving slip stream.

From an inspection of the outlines of the plane which I have shown, it will be appreciated that I have an extreme span, as represented by the length m—m. The span near the tail end of the machine is very much shorter being represented by the length n—n which is slightly more than one-third the extreme span. Further aft the span is slightly increased to direct the air flow to larger elevators than would be effective were there no increase in span at the tail end of the plane. This aft portion is preferably reversely curved.

It will also be appreciated that the chord of my lifting surfaces varies from the total length of the plane at the center to a small length at the wing tips. The plane shown has a wing aspect ratio very nearly 2.5 to 1.

The wing section which I have selected as having a most satisfactory performance is a double cambered convex curve, as shown in Fig. 2 with the deepest part about one third the chord. This section has a very small center of pressure movement when the flying angle is varied between the usual flying limits. The maximum magnitude of this movement is about one eighth the chord in a plain double cambered section.

In the plane illustrated, the resultant movement of the center of pressure will be considerably less than one eighth the length of the machine, on account of the shortening of the chord as the wing tips are approached.

By the use of reverse curved elevators 17—17 the movement of the center of pressure, in the normal position of the elevators, is still further reduced from what it would otherwise be. In fact, I am able to reduce the movement of the center of pressure to less than 5 inches in a plane having a 24 foot maximum chord at flying angles of 0 to 12 degrees.

It will be noted from Figs. 1 and 3 that the elevators 17 are attached directly at the rear of the main lifting planes 12—12. As the result of this arrangement, the completed plane has elevators forming a substantial part of the useful lifting surfaces. By this arrangement the movement of the elevators fixes the movement of the center of pressure over the entire wing area; instead of merely changing the center of pressure on the small stabilizer used on the tail of the ordinary airplane. Much less effort is required on the part of the pilot to manipulate the present arrangement of elevators than is usually necessary. With the present arrangement greater stabilizing action may be had in proportion to the effort put forth.

From further inspection of the outlines of the plane shown, it will be appreciated that I have made another wide departure from past practice. While the forward portion of my plane has a slight rake, I have provided each wing section with a portion of large negative rake, extending from o to p. The forward rake is such that the loci of the center of pressure of longitudinal elements will be very nearly a straight line. This will, in co-operation with the dihedral angle, make the plane remain in its course. The negative rake provides a minimum of air slippage or leakage and insures that all of this leakage will be at substantially right angles to the edge of the plane. By thus minimizing non-active surface, I have insured a maximum lifting effect with low aspect ratio. At low flying angles, the rear portion of the surface of the wings is inactive,—that is, it does not contribute to the effective lifting area of the plane. Therefore, the effective lifting area at such angles resembles that of the usual plane having a long wing span, a fuselage and tail with appurtenances. At higher flying angles, the entire surface of the wings becomes active: hence, my plane is such that it presents a different amount of effective lifting area at varying flying angles.

A pilot's cockpit 22 having a shield or hood 23 is provided between two bulkhead frames near the front end of the body portion 11. Forward of this cockpit is a removable hood 24 which covers the engine. The lower part of the body portion at the front end is enlarged as at 25 to carry the engine, not shown. As shown in Fig. 3, I have extended the body portion of the plane some distance from the front of the leading edge of the wings. This provides space directly behind the propeller which is available for housing the engine and carrying the pilot. This housing being directly behind the propeller, is in space which is comparatively dead as regards air flow. In addition, such a location improves the plane as regards control, as it places the weight further forward. 26 represents the propeller, the central portion of which is provided with a spinner 27, and 28 represents the landing gear.

Figure 6:
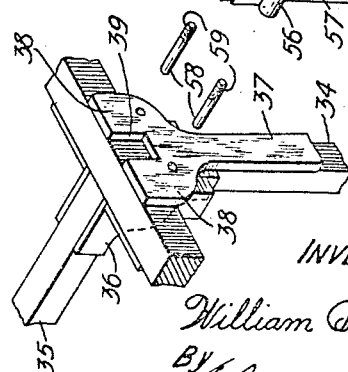
Fig. 6 is an enlarged view showing detailed arrangement of the fastening devices shown in Fig. 5.

As shown in Figs. 5 and 6, the body portion of the machine comprises upper and lower longérons 30 and 31, respectively, which are spaced apart by suitable frames, or bulkheads. These longérons run the whole length of the body portion of the machine, and are preferably made from wood. The frames which are used for supporting these longérons are generally rectangular or oval in shape and comprise three sticks 32, 33 and 34, and a fourth compression piece 35 which I prefer to make of multiple-ply veneer, known in the art as plywood. These four pieces are glued securely together and held in position by means of gussets 36. Outside each of the vertical sticks 32 and 34, I arrange a strip 37 which has bifurcated ends 38. These ends provide sockets 39 to receive the ends of wing spars.

The longérons are fastened to the frames by means of other gusset parts 40 which are glued to the side of a longéron and to a small block 41 which is made fast to the gussets 36. The upper longérons are covered with a sheet of veneer or fabric 42, and the lower longérons 31 with another of veneer or fabric 43.

The body portion is built up of these longérons and frames or bulkheads and is trussed by means of braces 44. It will therefore be apparent that I have provided a strong and light weight body portion for my machine.

I will now describe the structure used in supporting the wing sections from the body section. Each wing section is made up of spars a—a, as shown in Fig. 1. These spars are trussed, as shown typically in Fig. 7, and are preferably made up of short pieces of wood or steel or built up of veneer ply-wood to give the required strength.

The inner portion of the spar, that is the portion which is to be fastened alongside the body of the machine, has a top chord member 50 and a lower chord member 51 with a vertical member 52 therebetween. This vertical member is fastened to the members 50 and 51 by means of gusset plates 53. Fastened to these plates by means of bolt or rivets 54 are metal abutments 55 having a rolled over portion which provides a hole 57 through which tie rods 58 are adapted to pass. These tie rods also pass through the vertical strips 37, the longérons, 30 or 31, and the gusset plates 40. These rods 58 are threaded as at 59, and are adapted to co-act with nuts 60 which may be used to tighten the tie rods and hold the wing section in place alongside the body section of the plane. The top and bottom chord members 50 and 51 project inwardly beyond the vertical 52 as at 61 to co-operate with the sockets 39 in the bifurcated end of the vertical strips 37.

The wing sections may be clamped tightly in position by means of the tie rods and are held securely against movement by means of the co-operation of the socket 39 and projections 61. By removing the nuts 60, the wing sections may be readily removed from the body portion.

A suitable surface material is used as a covering over the spars to provide a lifting surface. For such a material I prefer to use ply-wood, but do not restrict myself to this material, as other comparatively-rigid material might be used. The interior of the body section of the plane may be entirely open back of the cockpit 22, and in addition the interior of the wing sections may also be open, except for radiator and landing gear compartments, so that the body-section and wings may be entered when it is necessary to make inspection.

The surfacing material, if of sheets of plywood or veneer is preferably glued, and if of other comparatively-rigid material is appropriately and positively secured, directly to ribs 50' on the upper and lower members of the spar trusses. This construction provides a wing portion structure which is an entity, all parts of which reinforce the other parts to provide a maximum of rigidity with a minimum of weight. The sheets of plywood, or of other comparatively-rigid material, may readily be staggered so that all the joints are broken. The wing surfaces shown in the drawings are entirely convex except for the reverse curve portion above described.

It will also be noted that the wing surfaces taper to a sharp leading and trailing edge, and that the veneer extends all the way to this edge. Such a surfacing as I have provided functions both as surfacing and as a part of the structure.

Previous structures using fabric for surfacing have been detrimental to the internal framework on account of the stresses set up by fabric shrinkage after the application of dope. In the structure shown, the veneer having very exceptional tensile strength, adds this strength to that of the internal bracing thus becoming a part of the structure as well as a surfacing.

It will be noted that I have provided a plurality of these spars and that by the use of a number of spars spaced apart, I provide a very rigid, more breakage-proof structure without the use of heavy parts.

The wing structure made up as above described is one which utilizes the material in an advantageous manner so as to be rigid in all directions in which forces are likely to act on it when in use. It is apparent that the plurality of spars $a$ extend all the way from the central portion 11 of the plane to the tip of the wing adjacent the ailerons 15. From the side elevation, as shown in Fig. 3, it appears that the spars have different depths, being graduated according to their location in the wing. The ailerons and wing tips are opposite the deepest portions of the wing, this being brought about by the forward rake. The longest and deepest of the spars, therefore, are able to be passed through or across the deepest portion of the ribs 50'. As the spars and ribs are both truss structures and interconnected, it is obvious that the wing structure is supported so that twisting is impossible. As the spars which support the wing tips are thus able to be the deepest spars, it is also obvious that they can be supported from the fuselage at widely spaced points on account of the great depth of the root of these spars, it being unnecessary to have exposed attaching devices, which, of course, would have detrimental resistances.

The wings are set at such a dihedral angle that the upper surfaces of the deeper portions of the two wings are respectively in alignment, the top chord members of the deeper spars of one wing being respectively in line with the corresponding top chord members of the other wing, and the compressive force exerted by one being in direct and straight-line opposition (through the corresponding interposed compression-piece of the center section 11) to the compressive force exerted by the other, so that there is no tendency for the two wings to collapse by folding upwardly. The members such as the member 35 of Fig. 5 carry the thrust imposed on the fuselage. This straight line arrangement of the top chord of the spars is brought about by selecting a proper dihedral angle depending upon the depth of the spars. It is thus possible to have straight line thrust without sacrificing lateral stability available from the dihedral angle of the lifting surfaces.

The plane I have shown houses substantially all the parts which ordinarily produce parasitic resistance, and I am therefore enabled to use surfaces with a very much lower lift per unit of area at low speeds than the types of planes heretofore in use, for they had such excessive head resistance to overcome. High speeds may therefore be obtained by the use of a minimum power.

The line of thrust may be located at the leading edge of the wing, or above or below the leading edge as requirements dictate. I have shown it below the leading edge.

I desire also to call attention to a further characteristic which is inherent to the form of plane I have selected. It will be readily seen that the plane is symmetrical about a fore and aft vertical plane. This is common practice for purpose of balance. In addition, however, the wings are symmetrical about a longitudinal plane at about a right angle to this fore and aft place. This construction reduces the number of different parts necessary in building up the plane for many parts will be duplicated. In addition the lifting power of the plane is substantially the same, whether it is flying in normal position, or inverted.

Figs. 8 to 10 show in considerable detail a form of engine housing which is used in my plane. In this housing the longérons 30 and 31, as shown in Fig. 5, are continued toward the front end of the body portion. The bulkheads are of varying shapes to conform to the sections of the engine housing and stream line the housing proper back to the rear portions of the body section. Skeleton bulkheads are shown at 62, 63 and 64 and are preferably made up from multiply veneer glued together. The bulkhead 64 is shown in outline in Fig. 9. In order that the weight may be reduced as much as is consistent with strength, lightening holes 64' are provided. The forward bulkhead 64 and a frame 65 carry the engine bed members 66'. All these bulkheads, longérons and the frame 65 are suitably trussed in both directions as shown. The diagonals correspond in a general way to diagonals 44 in Fig. 5. Forward of the frame 65 is a substantially circular frame 66. The engine rests between bulkhead 64 and frame 65, the cylinders of the engine overlying the upper portion of the frame 65. The housing is suitably covered by sheets of veneer, as shown in broken lines. This sheet is preferably supported from the longérons as shown; that is, a strip 67 of veneer passes from the lower longéron 31 to the upper longéron 30, and extends between two of the diagonals 68 and 69. The veneer below the longérons passes over the frame or bulkheads which are substantially circular and of varying diameters, as shown. The compartment between the bulkheads 63 and 64 is adapted to provide the pilot's cockpit 22.

I have placed the radiators for my plane in the wing sections, as shown at 81 in Fig. 4. Each radiator comprises a plurality of thin sections 82 through which the cooling water is circulated. The radiators are supported by means of bell crank and link or other suitable mechanism, as shown in Fig. 11, by which the radiator may be withdrawn into the body of the wing or moved outwardly therefrom into the air stream. By this I am able to present varying amounts of cooling surface to the air stream and do not add a large amount of detrimental surface. The mechanism as shown in Fig. 11 is merely diagrammatic. It comprises an operating handle 83 within reach of the pilot. This handle is connected through links 84 and 85 to bell cranks 86 and 87 which are used in raising and lowering the radiator. By the use of a rigid structure the positioning of the radiator will not be dependent upon gravity, for the plane will not be horizontal at all times. It is understood that these radiators are placed in a tight compartment between two spars, in order that the opening through which they pass will not lead to the entire inner structure of the plane. A shutter 88 and convenient operating means 89 are provided. By these the pilot is enabled for comfort to control the flow of warmed air from the radiator compartment to the cockpit.

A modified form of radiator control is shown in Fig. 12 which is substantially the same as that shown in Fig. 11, except that the radiator is pivoted at one end as at 90.

Figure 14:
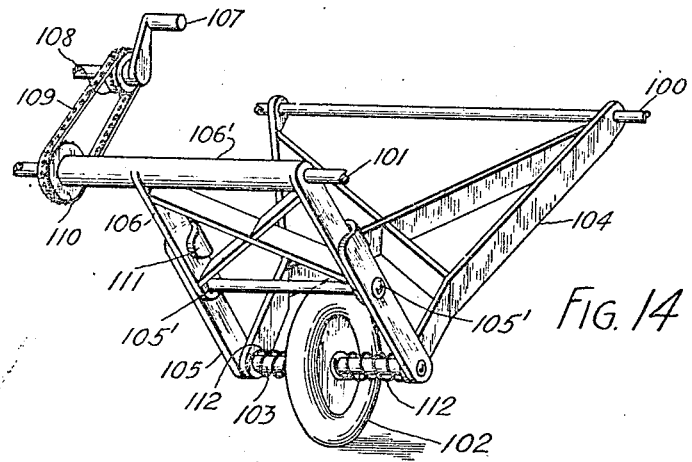
Fig. 14 is a perspective view showing one form of folding landing gear in landing position.

In Fig. 14 I have shown one form of a retractable running or landing gear using a single wheel. This gear is preferably supported from two parallel shafts 100, 101, which are preferably supported in the wing portions of the plane and carried by beams or other members connected to the spars. The single wheel 102 is carried loosely on the shaft 103. This shaft is supported from the shafts 100 and 101 by a suitable toggle mechanism. This mechanism comprises a strong and rigid framework 104 directly from the shaft 103 to the shaft 100 as one member. The second member 105 of the toggle is connected from the shaft 103 to a joint 105', and the other member 106 of the toggle is between the joint 105' and an operating shaft 106' journaled on the shaft 101. Suitable means for operating the shaft 106' are provided in the form of a handle 107, pinion 108, sprocket chain 109 and gear 110. The frame 104 is braced, as shown, in order that it will be able to withstand the thrust between the wheel and the plane during landing. Suitable means as ears 111 are provided to lock the toggle mechanism after it has passed center, and to prevent collapsing the toggle when the weight of the plane rests upon the wheel.

In order to minimize the strain to which the landing mechanism is subjected during landing, the wheel 102 is carried loosely on the shaft 103, and springs 112 on either side take up the side thrust of the wheel biasing the wheel to the middle of the shaft 103.

Figure 15:
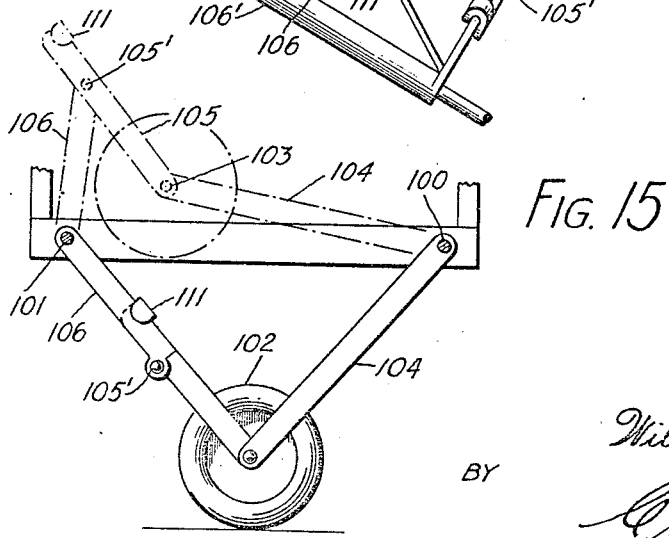
Fig. 15 is a diagrammatic view of the landing gear showing it (in full lines) in landing position, and also (in broken lines) as withdrawn into the wing.

In Fig. 15 the mechanism just described is shown in both landing position and withdrawn into the wing.

Figure 16:
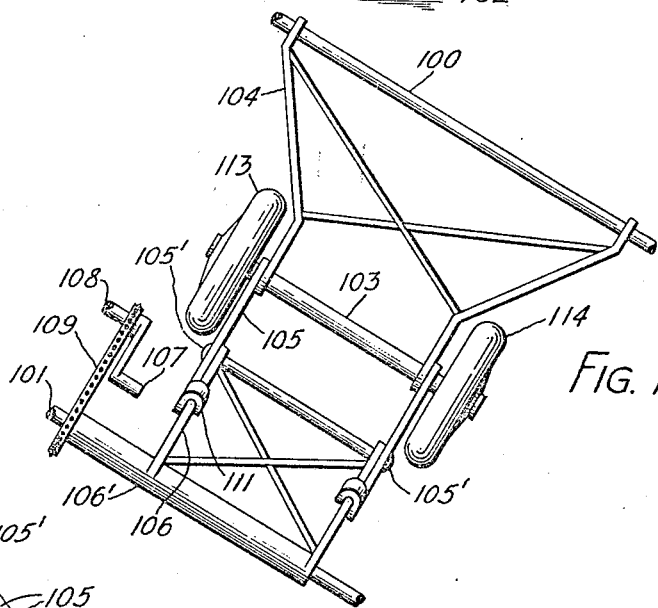
Fig. 16 shows a further modification, in plan, of the landing chassis having two wheels.

A modified form of retractable landing gear, as shown in Fig. 16, is substantially the same as shown in Fig. 14, except that it carries two wheels 113 and 114. This type of landing gear is preferably adapted for use for larger planes in which clearance will be available for the parts. It is understood that the mechanism shown in Fig. 14 would be duplicated in the other wing portion and that the gear, when in the raised position, will be enclosed in a suitable compartment in the wing.

As many changes could be made in the construction and form without departing from the scope of the following claims, it is intended that all matter contained in the above description, or shown in the accompanying drawings, shall be interpreted as illustrative only and not in the limiting sense.

I claim:

1. An airplane comprising a body portion and provided with a plurality of sockets, a pair of wing sections cooperative with said sockets, and tie rods for holding the wing sections alongside the body section.

2. An airplane having a double convex wing surface and an elevator merged therewith, said elevator continuing the stream lining of the wing surface to provide a reversely curved portion.

3. An airplane having an elevator, stream lined lifting surfaces merged with the elevator, a main rudder above the elevator and an auxiliary rudder below the elevator, to cooperate with the slip stream from the lower lifting surface.

4. An airplane having an elevator which is reversely stream-lined relative to the lifting surfaces of the plane, combined with a main rudder above the elevator, and an auxiliary rudder below the elevator to cooperate with the relatively moving slip stream.

5. In an airplane, a main or body portion comprising four longérons spaced apart and held fixedly by frames, said longérons providing an engine support and an engine housing of cylindrical shape fastened to the body portion by plywood, said plywood being glued to the side longérons and passing underneath the engine support.

6. An airplane comprising a body portion having a double convex stream lined surface except in the forward center portion where it is enlarged to provide an engine or passenger housing.

7. An airplane having a body portion and wing portions fastened thereto and stream lined therewith, said body portion being provided near the front end with a lift-contributing engine-housing underneath the body portion.

8. An airplane comprising a body portion, an engine bed and a housing therefor, said housing being supported from said body and comprising plywood which is glued to the body and envelops the engine bed.

9. A support for airplane engines comprising a housing beneath the body portion of the plane and secured thereto by plywood.

10. An airplane including a wing, a fuselage secured to said wing and a stabilizer secured to said fuselage and immediately to the rear of said wing, the trailing edge of said wing merging into the leading edge of said stabilizer.

WILLIAM B. STOUT.